UNITED STATES PATENT OFFICE.

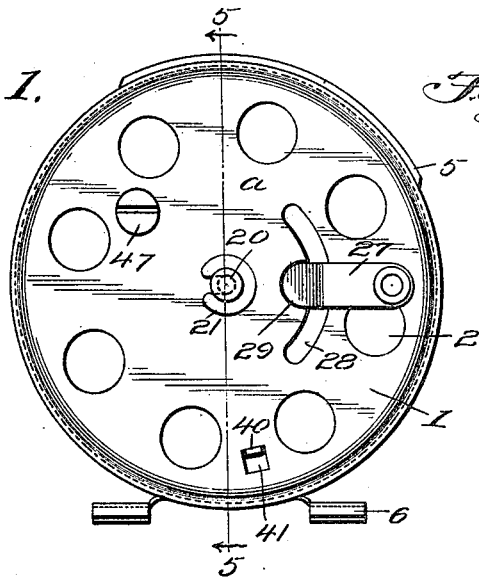

WALTER E. HODGES AND CHARLES F. LARZELERE, OF FLINT, MICHIGAN.

FISHING-LINE REEL.

1,407,537.  Specification of Letters Patent.  Patented Feb. 21, 1922.

Application filed March 25, 1920. Serial No. 368,521.

*To all whom it may concern:*

Be it known that we, WALTER E. HODGES and CHARLES F. LARZELERE, citizens of the United States, residing at Flint, in the county of Genesee and State of Michigan, have invented certain new and useful Improvements in Fishing-Line Reels, of which the following is a specification.

This invention relates generally to improvements in reels, and more particularly to that type of reels used in fishing.

The principal objects of the invention are: to provide a reel whose parts are held in assembly without the use of screws, and in which in making an assembly of the reel no tools are necessary; to provide a reel wherein the operating handle is so disposed with respect to the rotational axis of the reel that a maximum mechanical efficiency is attained; and to provide means whereby a fishing line is guided and prevented from tangling when reeling or casting.

Another, and equally important object of the invention is to provide means for effecting triple control of the operation of the reel so that the very desirable "clicking" action will be attained in addition to free rotational action and reverse stop action thereof.

For the purpose of illustrating this invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawings:

Figure 1 is a side elevation of the casing of the reel.

Figure 2 is a side elevation of the opposite side of the casing shown in Figure 1 and illustrates the disposition of the reel therein.

Figure 3 is an edge view of the reel.

Figure 4 is a detail view looking upwardly toward the bottom thereof, showing to advantage the metal clip used in attaching the reel to a fishing rod.

Figure 5 is a view on the line 5—5 of Figure 1.

Like characters of reference indicate like or similar parts throughout the several views of the drawings, in which:

*a* designates generally the reel casing which is substantially cylindrical and formed with an open side and a closed side 1. The side closure 1 is provided with a plurality of circularly arranged openings 2 for ventilating the interior. The edge face 3 of the casing is also provided with a plurality of ventilating openings 2 and an elongated slot 4 the edges of which are flanged outwardly as at 5 to form a guard for a fishing line in a manner which will hereinafter appear. Furthermore the casing has a pair of clips 6 struck therefrom which extend in a horizontal plane in opposite directions to form attaching clips for securing the reel to a fishing rod. As illustrated clearly in Figure 4 the clips are split as at 7 and curved arcuately in cross section to conform to the shape and size of a fishing rod.

The reel proper comprises a circular body in the form of a plate 8 the peripheral edge of which is provided with uniformly spaced apart slits 9 to form fingers 10. The fingers 10 are alternately bent outwardly on opposite sides of the body and curved to form in their entirety a well ventilated spool upon which a fishing line is carried. As illustrated in Figures 2 and 5 a plate 11 is riveted as at 12 to the body 8 and is bent or offset outwardly and has its free end turned as at 13 and riveted to two of the fingers 10. A pin 14 fixed to the upper edge of the plate 11 carries a handle 15, and attention is directed to the fact that by disposing the handle adjacent the periphery of the reel the greatest mechanical efficiency is attained.

Formed in the center of the side closure 1 of the casing is an opening for receiving the axle 16 of the reel which is formed with an enlarged portion constituting annular portions 17, 18 and 19 decreasing in diameter respectively toward the outer end of the axle. The smallest of the members, designated 19 engages the wall of the opening in the casing closure 1 and a head 20 is formed on the end of the axle between which and the casing closure 1 a split spring washer 21 is positioned to hold the axle securely in position thereupon. Rotatably mounted on the axle 16 is a sleeve 22 which is formed with one closed end and has an annular flange or shoulder 23 intermediate its extremities against which the body 8 of the reel abuts when it is forced upon the sleeve as illustrated in Figure 5. In assembling the reel the same is forced upon the sleeve 22 until it abuts shoulder 23, then a spacing collar 23ª, and then a ratchet wheel 24 are also forced on the sleeve in the order named so that the assembly will constitute a rigid structure. The annular member 17 forms a spacing unit between the end of the sleeve 22 carrying the ratchet wheel and an adjusting element 25 movably carried upon the annular portion 18.

The adjusting element 25 includes a semicircular body 26 having a radial arm 27 extending from its perimeter and which is bent intermediate its extremity to extend through an arcuate slot 28 formed in the closed side 1 of the casing. A notch 29 in one inner edge of the slot 28 holds the arm 27 normally in a "clicking" position.

From the foregoing it is thought that the operation of the fishing reel will be understood, but as many changes could be made in the above construction and many apparently widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language might be said to fall therebetween.

What we claim is:

1. A reel of the class described comprising a body in the form of a circular plate having a plurality of radially extending fingers at its periphery, said fingers being bowed laterally and those on one side alternating with those on the other and forming in their entirety a ventilated line carrying spool, a plate fixed at one end to one face of said circular plate adjacent the bases of said fingers and off-set outwardly and secured at its free end to said fingers, and a handle fixed to said plate adjacent the perimeter of said reel body, thereby obtaining maximum mechanical efficiency in the rotation of the reel.

2. In a fishing reel, a circular casing having one end open and the other closed, the closed end having a plurality of ventilating openings, the perimeter of said casing being also provided with ventilating openings and with an elongated slot-like opening surrounded by an outturned flange designed for the passage of a fishing line, said perimeter also having a pair of clips struck out therefrom and extended in opposite directions to form means for attaching to a rod, a reel mounted in said casing and comprising a rotatably mounted circular plate having uniformly spaced radially extending peripheral outwardly bowed fingers, said fingers being arranged on opposite faces of said plate, those on one side alternating with those on the other forming a line receiving annular trough at the perimeter of said plate, a laterally offset handle on one face of said plate near the perimeter thereof, and extending through the open end of said casing, and means to control the rotation of the reel and retard its movement in either direction.

In testimony whereof, we affix our signatures hereto.

WALTER E. HODGES.
CHARLES F. LARZELERE.